United States Patent
Vincent et al.

(10) Patent No.: US 8,960,643 B2
(45) Date of Patent: Feb. 24, 2015

(54) DOUBLE OFFSET BALL MEMBER USABLE IN BALL VALVES AND OTHER FLOW CONTROL APPLICATIONS

(71) Applicant: Chromatic Industries, Inc., Conroe, TX (US)

(72) Inventors: Kevin Vincent, Kingwood, TX (US); Charlie Partridge, Houston, TX (US); Miguel Barroso, Houston, TX (US); Fred Casey, Willis, TX (US); Blake Smith, College Station, TX (US)

( * ) Notice: Subject to any disclaimer, the term of this patent is extended or adjusted under 35 U.S.C. 154(b) by 54 days.

(21) Appl. No.: 13/815,325

(22) Filed: Feb. 21, 2013

(65) Prior Publication Data

US 2014/0231690 A1    Aug. 21, 2014

(51) Int. Cl.
    *F16K 5/06*     (2006.01)
    *F16K 5/00*     (2006.01)

(52) U.S. Cl.
    CPC .............. *F16K 5/0605* (2013.01); *F16K 5/0689* (2013.01)
    USPC .................................. 251/315.16; 251/315.07

(58) Field of Classification Search
    USPC .............. 251/315.16, 315.01, 315.07, 315.08
    See application file for complete search history.

(56) References Cited

U.S. PATENT DOCUMENTS

| | | |
|---|---|---|
| 2,095,136 A | 6/1936 | Jaussaud |
| 2,765,142 A | 12/1951 | Drake |
| 2,577,725 A | 12/1957 | Drake |
| 3,006,602 A | 10/1961 | Usab |
| 3,064,937 A | 11/1962 | Pryor |
| 3,168,279 A | 2/1965 | Anderson et al. |
| 3,170,669 A | 2/1965 | Roos |
| 3,379,408 A | 4/1968 | Lowrey |
| 3,410,523 A | 11/1968 | Kelly et al. |
| 3,456,916 A | 7/1969 | Ytzen et al. |
| 3,712,584 A | 1/1973 | Wise et al. |
| 3,780,985 A | 12/1973 | Perry |
| 3,846,885 A | 11/1974 | Perry |
| 3,946,986 A | 3/1976 | Sutter et al. |
| 4,124,036 A | 11/1978 | Rogers |
| 4,137,936 A | 2/1979 | Sekimoto et al. |
| 4,147,326 A | 4/1979 | Natalizia |
| 4,164,343 A | 8/1979 | Graebner |
| 4,260,129 A | 4/1981 | Groenefeld |
| 4,410,165 A | 10/1983 | Koch et al. |
| 4,542,878 A | 9/1985 | Kulisek |
| 4,548,384 A | 10/1985 | Harding |
| 4,632,140 A | 12/1986 | Harding |
| 4,640,492 A | 2/1987 | Carlson, Jr. |
| 4,683,906 A | 8/1987 | Butler et al. |
| 4,718,444 A | 1/1988 | Boelte |
| 4,822,000 A | 4/1989 | Bramblet |

(Continued)

*Primary Examiner* — Craig Schneider
*Assistant Examiner* — Michael R Reid

(57) ABSTRACT

Ball valves and ball valve components usable to control the flow of fluids and methods for manufacturing said ball valve components. Ball valves include a ball member comprising two curved segments of like shape and size, which are integrally joined and disposed symmetrically to one another relative to the axis of rotation of the ball member. A bore extends through the joined first and the second curved segments, wherein the first end of the bore is located on the first curved segment and the second end of the bore is located on the second curved segment. Each curved segment is disposed symmetrically to one another, relative to the axis of rotation. The area of separation, between the curved segments, defines shoulders of like configuration, wherein each shoulder is located symmetrically with respect to the other relative to the ball member's axis of rotation.

24 Claims, 5 Drawing Sheets

(56) References Cited

U.S. PATENT DOCUMENTS

| | | |
|---|---|---|
| 4,881,718 A | 11/1989 | Champagne |
| 4,936,547 A | 6/1990 | Obst |
| 5,152,502 A | 10/1992 | Randall et al. |
| 5,228,645 A | 7/1993 | Reinicke |
| 5,324,008 A | 6/1994 | Bonetti |
| 5,333,834 A | 8/1994 | Soderberg |
| 5,482,253 A | 1/1996 | Klyde |
| 5,507,469 A | 4/1996 | Soderberg |
| 7,059,585 B2 | 6/2006 | Dalluge et al. |
| 7,484,523 B2 | 2/2009 | Church |
| 7,681,865 B2 | 3/2010 | Furnival |
| 7,836,909 B2 | 11/2010 | Church |
| 2010/0308247 A1 | 12/2010 | Partridge |
| 2011/0278487 A1 | 11/2011 | King |

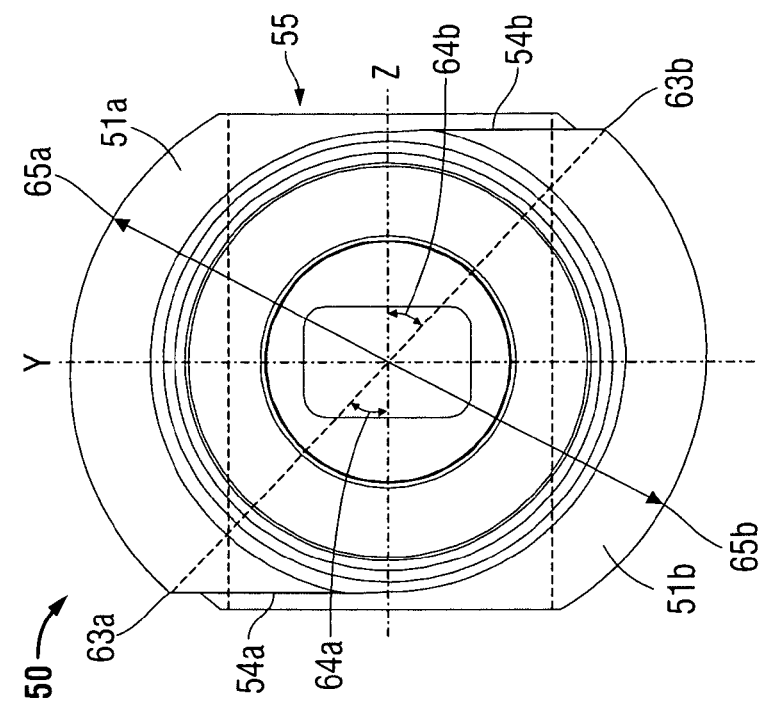
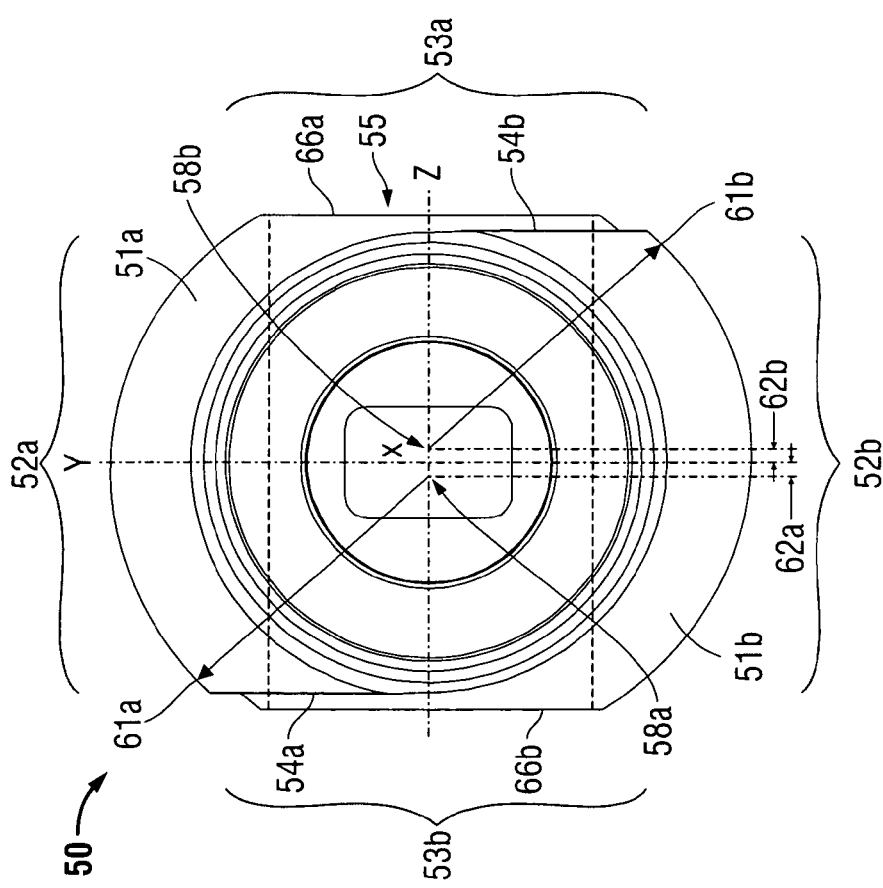

DOUBLE OFFSET BALL MEMBER USABLE IN BALL VALVES AND OTHER FLOW CONTROL APPLICATIONS

FIELD

Embodiments usable within the scope of the present disclosure relate, generally, to ball valves and other valves usable to control the flow of fluids, and more particularly, but not by way of limitation, to a ball member configuration having a variable radius, which results in a variable force being exerted against the valve seats as the ball member is turned between the open and closed positions, thereby changing the sealing pressure between the ball member and the valve seats and increasing the life of the seals in the valve seats.

BACKGROUND

Flow control valves, such as ball valves, are well known in the art and commonly comprise a valve body or housing having an interior cavity and a pair of fluid flow channels extending through the housing. A ball member is located within the cavity and is provided with an axial throughbore, which is selectively aligned with, or disposed transverse to, the fluid channels in the housing, by rotating the ball member about an axis of rotation to control the flow of fluid through the fluid channels. A pair of annular seats are located between the ball member and the internal wall of the housing and are positioned about the throughbore and the fluid channels to prevent fluids from leaking into the interior cavity of the valve.

In valve arrangements of the aforementioned type, seat life and fluid leakage has been a reoccurring problem. Since the ball member is constantly in sealing engagement with the seats, compressing them in both the open and closed valve positions, the seats tend to wear out after a period of time and must be replaced. The problem is particularly manifested when the valve is used to control flow of an abrasive fluid, when the fluid has a relatively high pressure, and/or when the valve is used under service conditions which require that the valve be rapidly cycled between open and closed positions. The same problem is present to some degree in all types of ball valves in the course of fluid flow applications. When the seats have become worn, they are otherwise no longer capable of performing their intended sealing function and must be replaced to eliminate consequent leakage of fluid between the housing and the ball member. Replacement of the seats requires that the valve be taken out of service and new seals or seats be installed.

In an effort to deal with the foregoing problems, valve arrangements have been designed that reduce seat loading when the valve is in its open position. For example, one ball valve design includes a split ball, wherein a cam, which rides within a split at the bottom of the ball, spreads the ball to form a tighter seal with the valve seats, as the ball is rotated to its closed position. Other designs utilize plugs or ball segments, which seal against a single seat in the housing, and which are mounted eccentrically on an actuator shaft or a stem, so that the plug is moved into forcible contact with the seat in the closed position of the valve. Moving the valve to the open position moves the plug away from the seat, allowing fluid to flow through the valve.

Valves employing the split ball design or eccentrically offset plugs are, however, relatively complicated and expensive to manufacture and maintain. Eccentrically mounted plugs also suffer from other disadvantages, since they involve an asymmetrical or unbalanced design. Specifically, eccentrically mounted plug valves are prone to leaking problems arising from rapid internal component wear, resulting from lack of structural support to counter forces created by high fluid pressures.

Therefore, there is a need for a fluid flow control valve that obviates all the above problems by providing a novel ball member having a symmetrical and balanced design, improving the internal structural support to counter forces created by high fluid pressures.

There is also a need for a ball member comprising an outer surface having a gradually increasing radius with respect to the axis of rotation. As the ball member rotates from the open valve position to the closed valve position, the outer surfaces gradually seal against a pair of associated upstream and downstream valve seats, to achieve maximum seal loading at the full closed valve position.

There is also a need for an improved ball member configured for use with conventional valve housing and seats, while improving valve life and sealing performance of the valve.

The present invention meets all of these and other needs.

SUMMARY

Embodiments usable within the scope of the present disclosure relate, generally, to flow control valves, components for controlling the flow of fluids through said valves, and methods of manufacturing said components.

An embodiment includes a ball member usable in a ball valve, the ball member comprising a first round segment, a second round segment, wherein the round segments are offset from one another and integrally joined symmetrically to one another relative to an axis of rotation of the ball member. The ball member has a progressively changing radius with respect the axis of rotation and a bore extending therethrough transverse to the axis of rotation, wherein the bore has a longitudinal axis. During operation, the ball valve is opened and closed to fluid flow by rotating the ball member about the axis of rotation, wherein the rotation of the ball member progressively changes force of contact between the ball member and a ball valve seat. The first round segment can comprise a first curved surface having a first concave edge and a first convex edge, wherein the second round segment can comprise a second curved surface having a second concave edge and a second convex edge.

In an embodiment, the first and second round segments are offset from one another along the longitudinal axis of the bore. In another embodiment, the first round segment comprises a first center point, wherein the second round segment comprises a second center point, and wherein the first center point and the second center point are located on opposite sides of the axis of rotation The ball member can also comprise a first protruding member extending from the first and the second round segments along the axis of rotation and a second protruding member extending from the first and the second round segments along the axis of rotation opposite the first protruding member, wherein the first protruding member and the second protruding member can be integrally formed with the ball member.

An embodiment of the ball member can also comprise a first shoulder defined by a first surface area located between the first and second round segments, wherein the first round segment extends past the second round segment and a second shoulder defined by a second surface area located between the first and second round segments, wherein the second round segment extends past the first round segment, wherein the bore comprises a first opening and a second opening, wherein the first shoulder encircles part of the first opening of the bore, and wherein the second shoulder encircles part of the second opening of the bore.

An embodiment can also comprise a first border located between the first and second round segments and a second border located between the first and second round segments opposite the first border, wherein the first and second borders are located on the surface of the ball member, wherein the first and second borders are oriented perpendicular to the longitudinal axis of the bore.

In addition, embodiments usable within the scope of the present disclosure relate to a method for manufacturing a ball member, one such method comprises the steps of forming a first spherical portion of the ball member by moving a cutting tool toward a workpiece along an axis of the cutting tool and by rotating the workpiece about 180 degrees about an axis of rotation oriented generally perpendicular to the axis of the cutting tool. Forming a second spherical portion of the ball member comprises moving a cutting tool toward the workpiece along the axis of the cutting tool, rotating the workpiece about 180 degrees about the axis of rotation oriented generally perpendicular to the axis of the cutting tool, and machining a bore through the first and second curved portions transverse to the axis of rotation. The steps comprising forming the first and second portions can be performed simultaneously.

Alternate embodiment of the process can include the step of moving the cutting tool generally perpendicular to both the axis of the cutting tool and the axis of rotation away from a point of intercept of said axes for about a first 90 degrees of rotation of the workpiece and towards the point of intercept of said axes for about a second 90 degrees of rotation of the workpiece. An embodiment can also include steps of forming a variable radius of the ball member relative to the axis of rotation.

The method for manufacturing a ball member can also include the steps of machining the workpiece to form a first cylindrical protrusion along the axis of rotation and machining the workpiece to form a second cylindrical protrusion along the axis of rotation opposite the first cylindrical protrusion.

In addition, embodiments usable within the scope of the present disclosure relate to other embodiments of a ball member usable in a ball valve, the ball member comprising a body segment having a generally rounded shape and an axis of rotation, wherein the body segment comprises a bore having a longitudinal axis, wherein the bore extends through the body segment transverse to an axis of rotation, a first sloped surface, and a second sloped surface. The first and second sloped surfaces comprise a progressively changing radius with respect to the axis of rotation, wherein the ball valve is opened and closed to fluid flow by rotating the body segment about the axis of rotation. Each of the first and second sloped surfaces may comprise boundaries having a concave and a convex shape adjacent to an opening of the bore.

An embodiment can further comprise a first protruding member extending from the body segment along the axis of rotation and a second protruding member extending from the body segment along the axis of rotation, opposite the first protruding member. The first protruding member and the second protruding member can be integrally formed with the body segment.

In addition, the ball member can comprise a first shoulder defined by an area located between the first and second sloped surfaces, wherein the first sloped surface extends past the second sloped surface and a second shoulder defined by an area located between the first and second sloped surfaces, wherein the second sloped surface can extend past the first sloped surface. The bore can further comprise a first rim and a second rim, wherein each of the shoulders encircle part of the corresponding rim of the bore.

The ball member can also comprise a first transition area, located between the first and second sloped surfaces, and a second transition area, located between the first and second sloped surfaces opposite the first transition area, wherein the first and second transition areas are oriented generally perpendicular relative to the longitudinal axis of the bore.

Also, the ball member can further comprise a first transition, located between the first and second sloped surfaces, and a second transition located between the first and second sloped surfaces opposite the first transition area, wherein the first and second transitions are oriented generally parallel relative to the first and second rims, respectively.

Lastly, the ball member can comprise a first shoulder defined by an area located between the first and second sloped surfaces, wherein the first sloped surface extends past the second sloped surface and a second shoulder defined by an area located between the first and second sloped surfaces, wherein the second sloped surface extends past the first sloped surface, wherein the first and second shoulders are oriented generally parallel relative to each other.

BRIEF DESCRIPTION OF THE DRAWINGS

In the detailed description of various embodiments usable within the scope of the present disclosure, presented below, reference is made to the accompanying drawings, in which:

FIG. 6A depicts a top view of an embodiment of the device usable within the scope of the present disclosure, which includes an embodiment of the ball member.

FIG. 6B depicts a top view of an embodiment of the device usable within the scope of the present disclosure, which includes an embodiment of the ball member.

DETAILED DESCRIPTION OF THE EMBODIMENTS

Figure 2:
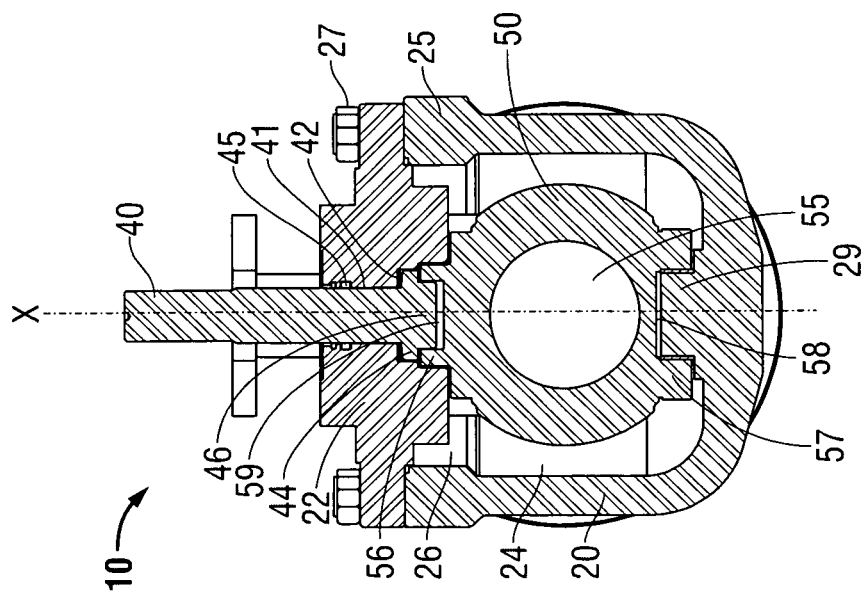
FIG. 2 depicts a cross sectional front view of an embodiment of the device usable within the scope of the present disclosure, which includes an embodiment of the ball valve in the open valve position.

Before describing selected embodiments of the present disclosure in detail, it is to be understood that the present invention is not limited to the particular embodiments described herein. The disclosure and description herein is illustrative and explanatory of one or more embodiments and variations thereof, and it will be appreciated by those skilled in the art that various changes in the design, organization, order of operation, means of operation, equipment structures and location, methodology, and use of mechanical equivalents can be made without departing from the scope of the invention.

As well, it should be understood that the drawings are intended to illustrate and plainly disclose selected embodiments to one of skill in the art, but are not intended to be manufacturing level drawings or renditions of final products and can include simplified conceptual views as desired for easier and quicker understanding or explanation. As well, the relative size and arrangement of the components can differ from that shown and still operate within the scope of the invention. It should also be noted that like numbers appearing throughout the various embodiments and/or figures represent like components.

Moreover, it should also be understood that various directions such as "upper," "lower," "bottom," "top," "left," "right," and so forth are made only with respect to explanation in conjunction with the drawings, and that the components can be oriented differently, for instance, during transportation and manufacturing as well as operation. Because many varying and different embodiments can be made within the scope of the concepts herein taught, and because many modifications can be made in the embodiments described herein, it is to be understood that the details herein are to be interpreted as illustrative and non-limiting.

Embodiments usable within the scope of the present disclosure relate, generally, to ball valves and other valves used to control the flow of fluids, and more particularly, but not by way of limitation, to a ball member configuration having a variable radius with respect to its axis of rotation, which results in a variable force being exerted against the valve seats as the ball member is turned between the open and closed positions, thereby changing the sealing pressure between the ball member and the valve seats and increasing the life of the valve seats.

Referring now to FIGS. 1, 2, 3A, and 3B, an embodiment of a fluid ball valve in accordance with the present invention is generally depicted. The ball valve (10) comprises, in general, a valve body or a housing (20), a top cover or a bonnet (22), a rotating actuation member or a stem (40), seats (30a, 30b), and a generally spherical shaped flow restricting member or a ball member (50).

Figure 1:
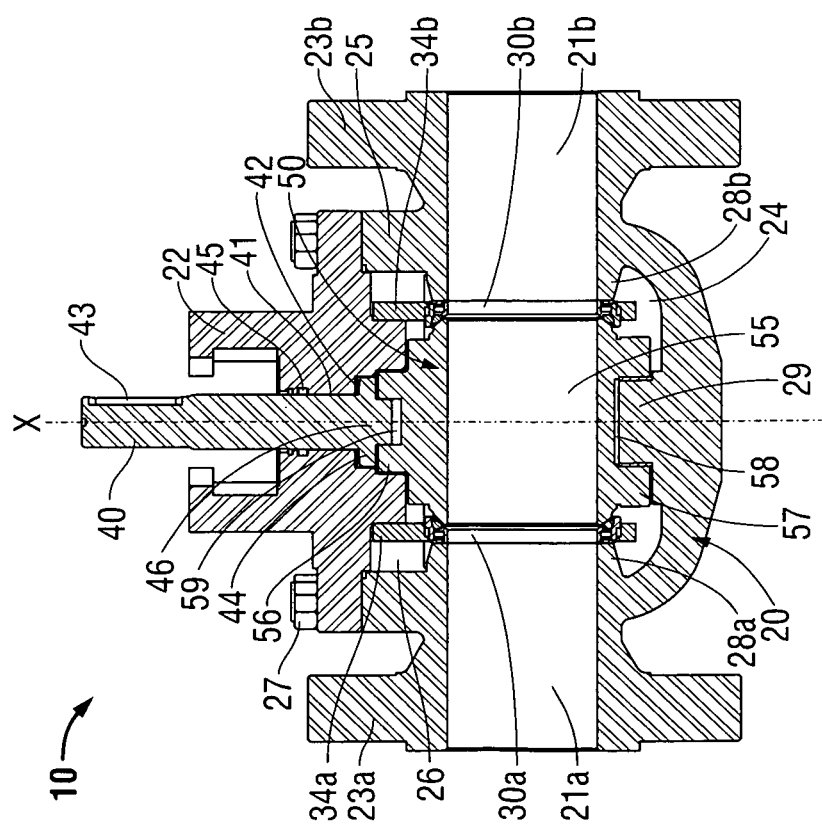
FIG. 1 depicts a cross sectional side view of an embodiment of the device usable within the scope of the present disclosure, which includes an embodiment of the ball valve in the open valve position.
Figure 3A:
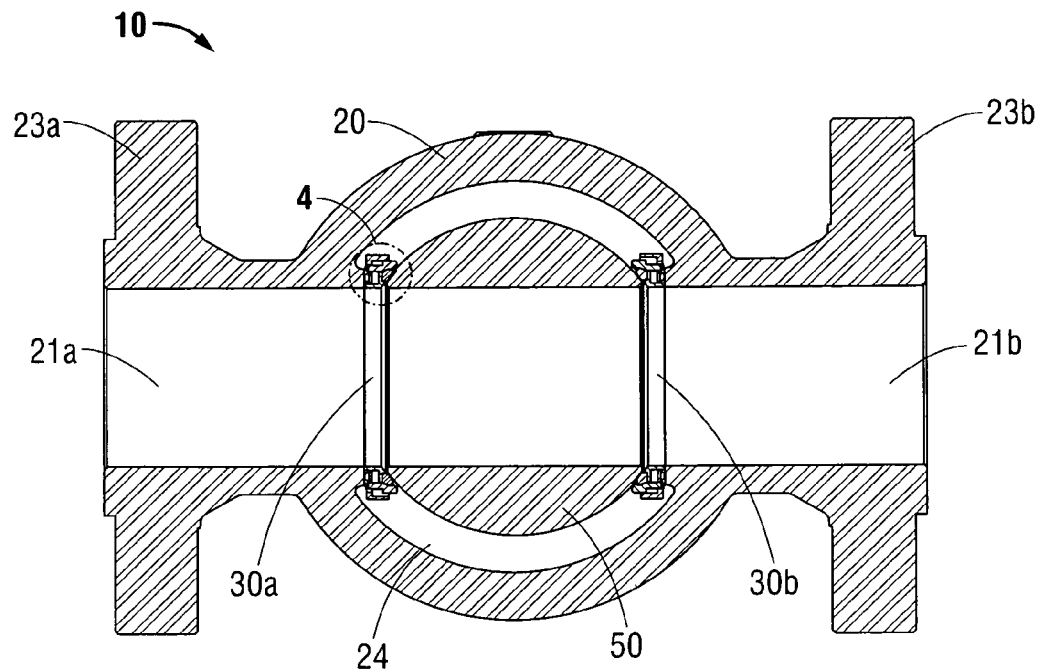
FIG. 3A depicts a cross sectional top view of an embodiment of the device usable within the scope of the present disclosure, which includes an embodiment of the ball valve in the open valve position.
Figure 3B:
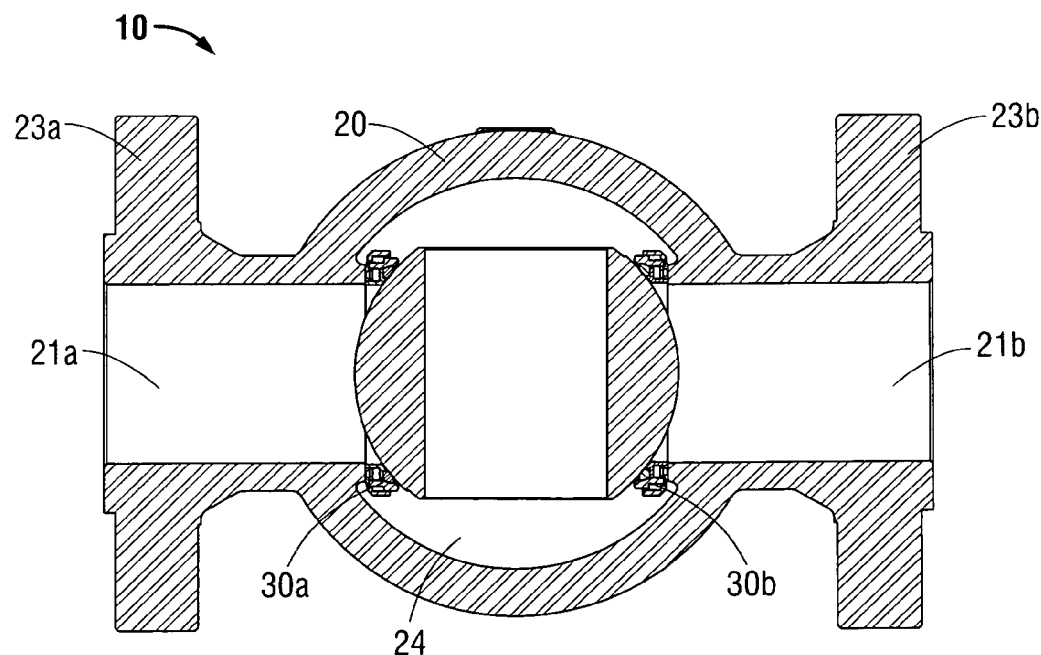
FIG. 3B depicts a cross sectional top view of an embodiment of the device usable within the scope of the present disclosure, which includes an embodiment of the ball valve in the closed valve position.

The housing (20) can be arranged to have any of several well-known external configurations and as depicted in FIGS. 1, 2, 3A, and 3B. At the center of the housing (20) is a generally spherical chamber, called a housing cavity (24), which encompasses the ball member (50). The housing further comprises a pair of fluid channels (21a, 21b) extending through the housing, on opposite sides of the central cavity (24). The fluid channels (21a, 21b) define an axial fluid passageway through the housing (20), enabling fluid transfer between external fluid conduits (not shown) or other equipment connected to the valve (10). The fluid channels (21a, 21b) can be configured to terminate with spaced flanges (23a, 23b), as depicted in FIGS. 1, 3A, and 3B, each of which can be connected to external fluid conduits (not shown) or other equipment, by bolts or by other means, such as threaded connectors (not shown). While the housing (20) need not be symmetrical as depicted, it is often desirable that the valve permits complete symmetry in orientation of installation. Thus, a ball valve (10) can be connected into a fluid system without regard to which flange (23a, 23b) is being connected to the pressure side of the fluid line.

As depicted in the embodiment of FIGS. 1 and 2, enclosing the top opening in the valve cavity is a bonnet (22), shown as a generally round and symmetrical plate member. The center of the bonnet (22) contains an aperture (41) of sufficient diameter to accommodate a valve actuating member, or a stem (40), extending therethrough in a perpendicular orientation relative to the top surface of the bonnet (22). The central aperture (41) contains a counterbore section, defining an upper cylindrical cavity (42), formed coaxially with the aperture (41) and located at the lower end of the aperture (41). The upper cylindrical cavity (42) structurally retains and supports portions of the stem (40) and the ball member (50). The upper portion of the valve stem (40) extends beyond the aperture (41) and terminates with an upper stem drive member (43), which is configured for connection with a valve actuator (not shown). The stem (40) can be rotated by means of a handle (not shown) attached to the upper stem drive member (43), allowing selective rotation of the ball member (50) between the open valve position shown in FIGS. 1, 2, and 3A, and the closed valve position shown in FIG. 3B. The actuation of the stem (40) can also be automated, whereby the rotation is performed by a fluid powered or electrical rotary actuator (not shown) attached thereto.

The lower portion of the valve stem terminates with an annular support ring (44), which extends radially from the lower portion of the valve stem (40). The annular support ring (44) engages the lateral surface of the upper cavity (42) to maintain the coaxial alignment between the valve stem (40) and the bonnet aperture (41). The annular support ring (44) also engages the upper surface of the upper cavity (42) to retain the valve stem (40) within the bonnet aperture (41) and to maintain engagement with the ball member (50). The upper cavity (42) is configured to receive both the support ring (44) as well as the upper trunnion (56). As in the depicted embodiment, the upper cavity (42) can have varying diameters in order to accommodate a support ring (44) and an upper trunnion (56) having different diameters.

As further depicted in FIGS. 1 and 2, sealing members (45) occupy the annular space between the stem (40) and the bonnet (22). These annular sealing members (45) perform the usual function of packing the stem (40) and can be fabricated from any known sealing or packing materials and configured in any manner known in the art, including, but limited to, elastomer O-ring seals, cup seals, polymer seals, composite seals, and metal seals.

The top portion of the housing (20) terminates with a ridge (25), which defines a valve cavity opening (26). The ridge (25) comprises the connection means for mounting of the bonnet (22) to the housing (20) in a secured and sealed relation. FIGS. 1 and 2 depict the means for connection to be in the form of a flange connection, securing the bonnet (22) to the housing (20) by means of a plurality of retainer threaded stud and nut assemblies (27). Although the figures depict one embodiment, it is not intended to limit the scope of the present invention to a bolted bonnet (22) construction. A number of bonnet connection systems (not shown) are commercially available at the present time and can be employed to secure a bonnet member, in sealed and positively retained assembly, with a valve body.

Referring again to FIGS. 1, 3A, and 3B, the embodiments depicted show a pair of annular sealing instruments, called seats (30a, 30b), which are supported against the housing (20) and located about the fluid flow channels (21a, 21b). Located at the inside terminus of each fluid channel (21a, 21b) is a seat shoulder (28a, 28b) usable to support the seats (30a, 30b) in position. Each seat shoulder (28a, 28b) can be shaped and proportioned to retain the corresponding seat (30a, 30b) in place during operation, preventing the seats from shifting when engaged with the ball member (50). The seats (30a, 30b), usable within the disclosed ball valve (10), can be of any type known in the industry. Among the seat configurations usable with the disclosed ball member (50) are double-block and bleed (DBB) and double-isolation and bleed (DIB) seat types, such as defined by API 6D/ISO 14313 design specifications.

FIGS. 1, 3A, 3B, and 4 depict DIB seats (30a, 30b) as one embodiment of the seats (30a, 30b) usable with the currently disclosed ball member (50). DBB valves typically contain two unidirectional seats (not shown). The unidirectional seats, when energized, isolate the pressure in the flow channels (21a, 21b) from the housing cavity (24) between the seats. If pressure is reversed, the seats are urged away from the ball member (50) and allow pressure to relieve from the housing cavity (24) to the flow channels (21a, 21b). This is a desirable function, particularly in liquid service. In the case where the valve housing cavity (24) is filled with liquid and heated due to process flow or external sources, pressure can build due to thermal expansion of the liquid in the housing cavity (24). Without the self-relieving unidirectional seats, this could lead to over-pressure in the valve cavity (24) resulting in leakage or rupture. DIB valves include one or two bidirectional seats (30a, 30b), as depicted in FIGS. 1, 3A, 3B, and 4. When two bidirectional seats (30a, 30b) are used, the valve provides double isolation from pressure at either flow channel (21a, 21b). This configuration has one operational drawback in that it cannot relieve pressure in the housing cavity (24) past the seats (30a, 30b). An external relief piping system (not shown) must be used to allow any pressure build-up in the housing cavity (24).

The action of the seats is determined by the pressure differentials that act on the seats. For the unidirectional seat (not shown), upstream pressure urges the seat against the ball member (50) and creates a seal between the seat and the ball member (50). Pressure in the housing cavity (24), on the other hand, urges the seat away from the ball member (50), breaking the seal between the ball member (50) and the seat, thereby relieving pressure within the housing cavity (24). Conversely, the bidirectional seats (30a, 30b) are urged against the ball member (50) by pressure regardless of the location of the pressure source, whether it's the fluid channel (21a, 21b) or the housing cavity (24). The DIB feature provides a second fluid flow barrier, such that while piping is removed downstream (as in a repair situation), the housing cavity (24) can be monitored for upstream seat leakage. The downstream seat provides the second barrier in the event the upstream seat begins leaking during the maintenance or repair.

Figure 4:
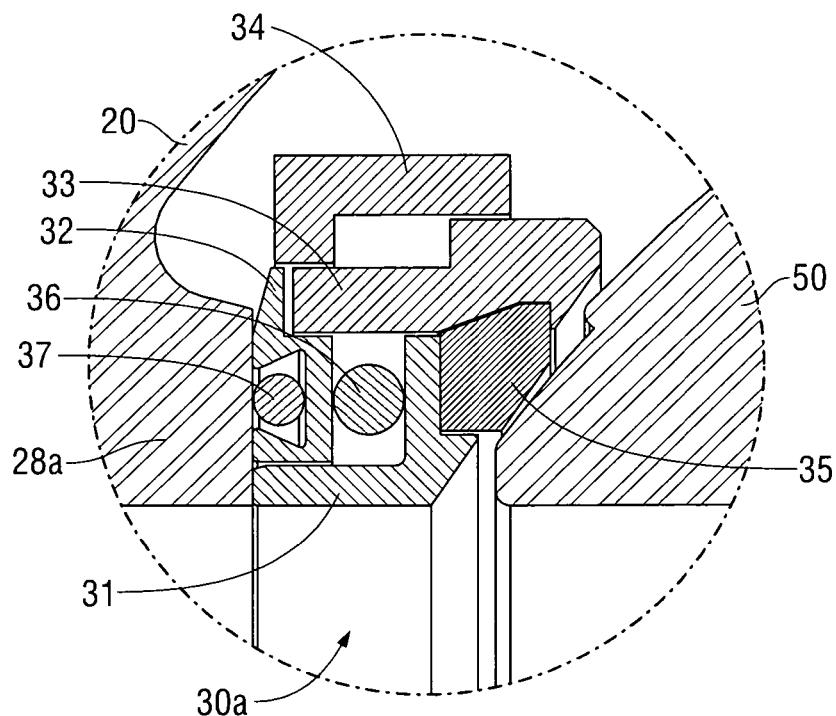
FIG. 4 depicts a cross sectional close-up view of an embodiment of the device usable within the scope of the present disclosure, which includes an embodiment of the ball valve seats in the open valve position.

FIG. 4 depicts a close-up view of one embodiment of a DIB seat (30a) usable within the scope of the current disclosure. The first seat (30a) comprises a plurality of seat segments (31, 32, 33) and a plurality of sealing elements (35, 36, 37), assembled to form the first seat (30a). The rear seat segment (32) is positioned against the first housing shoulder (28a) and encompasses the first sealing element (37) (e.g. an O-ring), which seals against the first shoulder (28a), limiting leakage adjacent to the shoulder. The interior seat segment (31) is also positioned against the first housing shoulder (28a), but is longer and extends past the rear seat segment (32). A second sealing element (36) is located between the rear seat segment (32) and the interior seat segment (31), limiting fluid leakage therebetween. An exterior seat segment (33) is located around the rear and interior seat segments (32, 31), with a third sealing element (35), called an insert, located between the exterior seat segment (33) and the ball member (50), limiting fluid leakage adjacent to the ball member (50).

The embodiment of the first seat (30a) depicted in FIG. 4, is an example of a floating and expandable seat usable with the valve (10) and the ball member (50) of the current disclosure. A floating and expandable seat design allows a uniform sealing action against surfaces, which may be unevenly placed against the seat. For example, in the closed ball valve position, one side of the ball member (50) can be positioned closer to one side of the housing shoulder (28a), resulting in greater compression of one side of the seat (30a). The disclosed floating and expandable seat design allows the seat (30a) to move towards or away, as well as sideways, from the ball member (50) and therefore adjust to uneven contact with the ball member (50), resulting in a generally uniform seat loading by the ball member (50). Although one embodiment of a floating seat is depicted in FIG. 4, any floating and expandable seat design known in the industry may be used with the ball valve (10) and the ball member (50) disclosed in the current application.

Also depicted in FIG. 4 is a first retainer (34a), which maintains the first seat (30a) in a generally constant position between the first shoulder (28a) and the ball member (50). As further depicted in FIG. 1, the first retainer (34a) can be held in position by connecting it to a lower portion of the bonnet (22), by use of any known means, such as threaded bolts, for example.

Figure 5A:
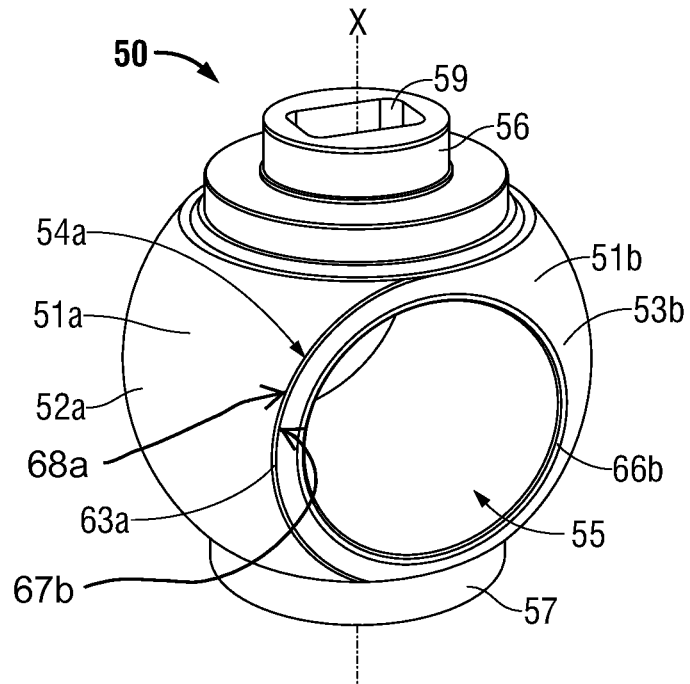
FIG. 5A depicts an isometric view of an embodiment of the device usable within the scope of the present disclosure, which includes an embodiment of the ball member.
Figure 5B:
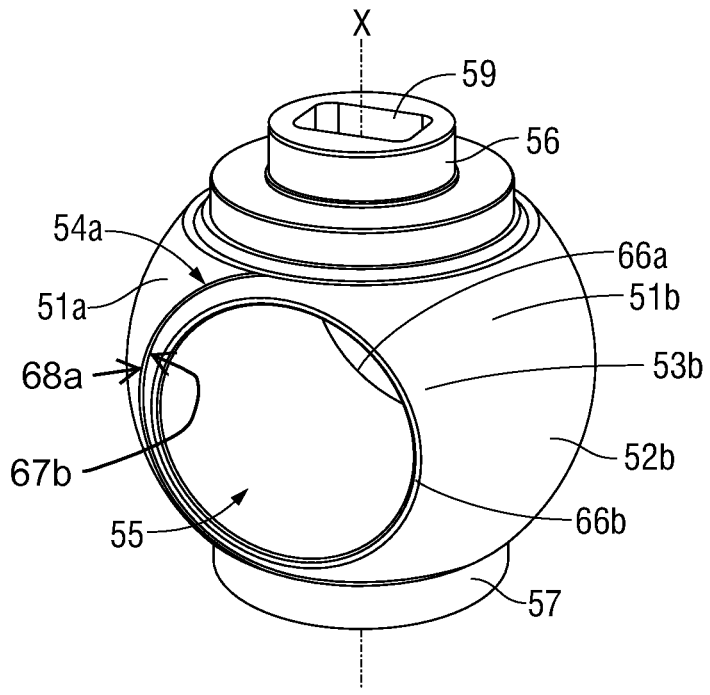
FIG. 5B depicts an isometric view of an embodiment of the device usable within the scope of the present disclosure, which includes an embodiment of the ball member.

Located within the housing cavity (24) is a fluid flow obstruction, called the ball member (50). As depicted in FIGS. 5A and 5B, the ball member (50) has a generally spherical or round shape comprising two partially spherical members, called spherical segments (51a, 51b), a throughbore (55), an upper trunnion (56), and a lower trunnion (57). The ball member (50) is adapted to be rotated about its axis of symmetry (X), which runs vertically through the center of the upper and lower trunnions (56, 57). The throughbore (55) extends transversely through the ball member (50) and functions as a fluid passageway, when each end or rim (66a, 66b) of the throughbore (55) is aligned with each fluid channel (21a, 21b), as depicted in FIG. 1. Therefore, the ball member (50) allows communication between the fluid channels (21a, 21b) when actuated to the open position and disconnects the fluid channels (21a, 21b) when actuated to the closed position, as in a typical ball valve arrangement.

Referring again to FIGS. 1, 2, 3A, and 3B, depicting one embodiment of a fluid flow control valve. The figures are not intended to limit the scope of the present invention to that construction as other designs are commercially available at the present time and can be employed without departing from the scope of the disclosed invention. Specifically, FIG. 1 depicts a ball valve embodiment comprising a throughbore (55) and fluid channels (21a, 21b) having a coaxial configuration; however, these fluid channels (21a, 21b) can be offset or oriented at a relative angle therebetween and/or in relation to the throughbore (55). Furthermore, the ball member (50) according to the present disclosure can also comprise a full port or restricted port design. Therefore, the diameter of the throughbore (55) depicted can be equal to, smaller than, or greater than the diameter of the fluid channels (21a, 21b).

FIGS. 1 and 2 also depict a ball member (50) having upper and lower trunnions (56, 57), which function as mounting and pivoting points for the ball member (50). As the ball member (50) is actuated between the open and closed positions, it rotates within a cylindrical cavity (42) at its upper end and about a cylindrical protrusion (29) at its lower end. As stated above, the upper cylindrical cavity (42) is fashioned as a counterbore, located at the lower portion of the bonnet aperture (41). The upper cylindrical cavity (42) receives the upper trunnion (56), while the cylindrical protrusion (29) extends upwardly from the housing (20) into the housing cavity (24), mating within a lower cylindrical cavity (58) in the lower trunnion (57). In the depicted embodiment, the upper trunnion (56) comprises two sections, an upper section, which is inserted into the upper cylindrical cavity (42) as described above, and the lower section, which comprises an outside diameter that is larger than the upper cylindrical cavity (42). The lower section of the upper trunnion contacts the bottom surface of the bonnet (22) to retain the ball member (50) in proper vertical position within the housing cavity (24) during operation. The upper and the lower trunnions (56, 57), the upper cylindrical cavity (42), and the cylindrical protrusion (29) are arranged coaxially, resulting in the ball member having an axis of rotation (X) located through the center of the trunnions (56, 57).

FIGS. 1, 2, 5A, and 5B depict upper and lower trunnions (56, 57) integrally formed with the spherical segments (51a, 51b) located therebetween. Such integral construction can be achieved through several techniques known in the art, such as, for example, casting the entire ball member (50) as a single piece or by using a milling machine to cut the entire ball member (50) from a single workpiece. Manufacturing processes usable to construct the ball member of the current disclosure are described in additional detail below.

In addition to supporting the ball member (50), the upper trunnion (56) also contains a cavity, or a stem receptacle (59), designed to mate with the stem (40), thereby enabling actuation of the ball member (50). The bottom portion of the valve stem (40), called the drive member (46), projects downwardly and engages within the stem receptacle (59). The stem receptacle (59) has a generally rectangular shape configured to receive the drive member (46). The stem receptacle (59) defines a stem connection, which can be in the form of a depression or receptacle or can have any other geometric form that compliments the drive member (46) and permits a non-rotatable relationship to be established between the ball member (50) and the stem (40), and can have other suitable geometry within the scope of the present invention. In an alternate embodiment, ball member (50) can be provided with a protruding member that establishes non-rotatable driving relation with the valve stem (40), which can be provided with a depression or a receptacle.

In addition to providing the pivoting points for the ball member (50), the upper and lower trunnions (56, 57), the upper cylindrical cavity (42), and the cylindrical protrusion (29) provide the ball member (50) with mounting surfaces, giving the ball member (50) structural support to withstand high fluid pressures, without resulting in fluid leakage or internal damage. During operation, especially in the closed valve position, the surface of the ball member (50) can be exposed to high fluid pressures. These pressures can generate large forces on the ball member (50), resulting in significant internal stresses being exerted upon its support structure. Certain valve designs, such as a floating ball design (not shown), can provide insufficient structural support, resulting in the ball member being shifted, causing fluid leaks into the valve cavity or the outlet port. Excessive shifting of the ball member can also result in damage to the trunnions, the stem, and internal seals. The trunnions (56, 57), the upper cylindrical cavity (42), and the lower cylindrical protrusion (29), as depicted in FIGS. 1 and 2, provide internal support for the ball member (50), maintaining it along the axis of rotation (X) and preventing excessive undesired movement of the ball member (50).

Although, in the embodiment depicted in FIGS. 1 and 2, the bottom trunnion (57) of the ball member (50) contains a bottom cylindrical cavity (58) for allowing the ball member (50) to rotate about a cylindrical protrusion (29) in the housing (20), other trunnion designs can be incorporated. For example, in one alternate embodiment (not shown), the lower trunnion does not contain a cavity, but comprises a solid cylindrical protrusion that sits within a cylindrical cavity formed within the lower internal surface of the housing. In this configuration, the lower trunnion is engaged within the cylindrical cavity, allowing the ball member to rotate about the axis of rotation while providing structural support to the ball member.

As previously stated and depicted in embodiments of FIGS. 5A and 5B, the ball member (50), in accordance with the present disclosure, further comprises two spherical segments (51a, 51b). These spherical segments (51a, 51b) comprise partial spheres of like shape and size, which are offset and integrally joined together, and disposed symmetrically to one another relative to the axis of rotation (X). A bore (55) extends through the joined first and the second spherical portions, wherein the first terminus of the throughbore (55) is located on the first spherical segment (51a) and the second terminus of the throughbore (55) is located on the second spherical segment (51b). The throughbore (55) is oriented generally perpendicular to the axis of rotation. However, in alternate embodiments, the throughbore (55) can be oriented in a traverse manner relative to the axis of rotation.

Furthermore, in the embodiments of the ball member (50) shown in FIG. 6A, depicting the top view of the ball member (50), each spherical segment (51a, 51b) comprises a center of sphere, called an offset point (58a, 58b), as each center of sphere is offset from the ball member's axis of rotation (X). Each offset point (58a, 58b) is located on either side of axis of rotation (X) along the longitudinal axis (Z) of the throughbore (55). Each spherical segment (51a, 51b) exhibits a radius (61a, 61b) with respect to its respective offset point (58a, 58b), located along the longitudinal axis (Z) of the throughbore (55) at a specific offset distance (62a, 62b) from the axis of rotation (X). Due to the offset distances (62a, 62b), the two offset points (58a, 58b), marking the centers of each spherical segment (51a, 51b), are shifted from each other by a distance comprising the sum of the first and second offset distances. Although FIG. 6A depicts an embodiment of the ball member (50) having offset points (58a, 58b) located along the longitudinal axis (Z), alternate embodiments of the ball member (50) can comprise offset points being located in various points along the Y-Z plane. The specific location of the offset points (58a, 58b) define the orientation of each spherical segment (51a, 51b) relative to the other, which affects the height of the shoulders (54a, 54b) and the characteristics of the radius (65a, 65b, see FIG. 6B) of the ball member (50) with respect to the axis of rotation (X).

As further depicted in FIG. 6A, because the two spherical segments (51a, 51b) are offset, there exist two areas of separation, called shoulders (54a, 54b), located between the spherical segments (51a, 51b) at the points where one spherical segment transitions to the other. The two shoulders (54a, 54b) are of like configuration, located on opposite sides of the ball member (50), wherein each shoulder is located symmetrically, with respect to the other, relative to the ball's axis of rotation (X). In the depicted embodiment, the shoulders (54a, 54b) are oriented generally perpendicular to the longitudinal axis (Z) of the throughbore. In the same embodiment, the shoulders (54a, 54b) can be oriented generally parallel with the rims (66a, 66b) of the throughbore (55).

Referring now to FIGS. 6A and 6B, an embodiment of the ball member (50) in accordance with the present disclosure is depicted. Although each spherical segment (51a, 51b) has a radius (61a, 61b) with respect to its offset point (58a, 58b), and exhibits a progressively increasing (or decreasing depending on direction) radius, called variable radius (65a, 65b), with respect to the axis of rotation (X), whereby the maximum radius is located at the top of the shoulder (54a, 54b) and the minimum radius is located at the bottom of the shoulder (54a, 54b). The surface area adjacent to the top of the shoulder (54a, 54b) is called the high surface area (52a, 52b), and the surface area adjacent to the bottom of the shoulder (54a, 54b) is called the low surface area (53a, 53b). As depicted in the embodiment in FIGS. 6A and 6B, the throughbore (55) penetrates the ball member through the low surface area (53a, 53b) of each spherical segment (51a, 51b). As a result, each low surface area (53a, 53b) of the ball member is truncated along the longitudinal axis (Z) of the throughbore (55).

As depicted in FIGS. 5A and 5B, the shape of the surface area of each spherical segment (51a, 51b) is further defined by the upper and lower trunnions (56, 57) extending from the ball member (50), having the spherical segments (51a, 51b) located therebetween. Specifically, the upper and lower boundaries of the surface areas of each spherical segment (51a, 51b) are defined by the trunnions (56, 57), whereby the upper and lower boundaries (i.e., edges) of the surface area of each spherical segment (51a, 51b) curve about the upper and lower trunnions. The lateral boundaries of the surface area of each spherical segment (51a, 51b), defined by the shoulders (54a, 54b), curve adjacent to the first and second rim (66a, 66b) of the throughbore (55). Specifically, the first lateral outwardly curving boundary (not shown) of the surface area of the first spherical segment (51a) curves outwardly (i.e., a convex boundary), around the far side of the first rim (66a), thereby encompassing the first rim (66a), while the opposite lateral inwardly curving boundary (68a) (i.e., a concave boundary) into the surface area, adjacent the near side of the second rim (66b), thereby excluding the second rim (66b). The shape of the spherical area of the second spherical segment (51b) has a similar shape, comprising an outwardly curving boundary (67b) (i.e., convex boundary) encompassing the second rim (66b) and an inwardly curving boundary (not shown) (i.e., concave boundary) excluding the first rim (66a). Therefore, if the surface area of each spherical segment (51a, 51b) was unrolled or its curvature about the axis of rotation (X) was straightened, the surface area of each spherical segment (51a, 51b) would have an elongated lune-like shape, wherein the concave and convex boundaries are separated by an additional area therebetween.

Referring now to FIG. 6B, the outer point (63a, 63b) of each shoulder initiates at a predetermined angle (64a, 64b) relative to the longitudinal axis (Z) of the throughbore (55), wherein each shoulder (54a, 54b) outlines a throughbore opening along a plane perpendicular to the throughbore axis (Z). In the depicted embodiment, the outer point (63a, 63b) of each shoulder (54a, 54b) is located at an angle (64a, 64b) relative to the axis (Z) of the throughbore (55). The height of each shoulder (54a, 54b) can be defined as the difference between the maximum and minimum radius (56a, 56b) of the ball member (50) adjacent to the shoulder (54a, 54b). The relative dimensions of the shoulders (54a, 54b) and the offset distances (62a, 62b), as depicted in FIG. 6A, are exaggerated for clarity, and in actual embodiments the height of each shoulder is very small. For example, in one embodiment, the ball member can have a sphere radius (61a, 61b) of 3.500 inches, an offset distance (62a, 62b) of 0.030 inches, a shoulder (54a, 54b) height of 0.060 inches, and the shoulder angle (64a, 64b) of 37.000 degrees.

Although the two spherical segments (51a, 51b) are described as being separate and distinct, the ball member (50) has a unitary configuration, wherein the two spherical segments (51a, 51b) are integrally formed. The outside surface of each spherical segment (51a, 51b) defines a sealing surface of the ball member (50), comprising a smooth finish, which enables it to form a fluid seal when compressed against the valve seats (30a, 30b) during operation. The spacing of the offset points (58a, 58b) relative to the axis of rotation (X) provides the ball member (50) with eccentric properties. Wherein each spherical segment (51a, 51b) comprises a radius (61a, 61b) with respect to its corresponding offset point (58a, 58b), each spherical segment (51a, 51b) can be eccentric with respect to the axis of rotation (X), enabling the ball member (50) to progressively increase contact force against the seats (30a, 30b). As the ball member (50) is rotated about the axis of rotation (X), which is traverse or generally perpendicular to the longitudinal axis (Z) of the throughbore (55), each spherical segment (51a, 51b) contacts a corresponding seat (30a, 30b) with progressively increasing or decreasing force. The operation of the valve is described in more detail below.

While the first and second spherical segments are defined above as comprising partial spheres of like shape and size, alternate embodiments exist, wherein each spherical segment comprises a spherical shape or any other rounded shape that may not be spherical. Specifically, the spherical segments may be generally rounded segments, comprising three-dimensional curved surfaces, having circular, elliptical, oval, spiral, or other curvatures. Although the generally rounded segments may not contain singular centers that are offset relative to the axis of rotation, the segments can be offset from one another and integrally joined, having the curved surfaces oriented away from each other. The generally rounded segments can also be disposed symmetrically, to one another, with respect to the axis of rotation.

The ball member (50), in accordance with the present disclosure as described above, can be incorporated into valve bodies having alternative designs and/or standard valve bodies known in the industry. One alternative embodiment (not shown) includes a ball valve, having a valve body comprising a bottom opening, whereby the bottom of the body is closed by a flanged cover. The internal surface of the valve body defining the valve cavity can comprise cylindrical cavities, as described in the embodiment depicted in FIGS. 1, 2, 3A, and 3B; however, the ball member can be installed in the valve cavity through the bottom opening. The upper trunnion (56) of the ball member can be inserted into a corresponding upper cylindrical cavity, while the lower trunnion (57) can be supported by a cylindrical protrusion or a bottom cylindrical cavity located within the bottom flange cover. The ball valve can otherwise be configured in the manner described above and depicted in FIGS. 1, 2, 3A, and 3B.

Another alternative ball valve design (not shown) can include a valve, wherein the ball member (50) is disposed between seats in a two-piece or a three-piece ball valve body, which are well known in the industry. The ball member (50) can be installed in the valve cavity through the side opening in the main body, prior to installation of an end member, which can have threaded ports or a flange connection for connecting to the main body. The housing cavity can be designed to accommodate upper and/or lower trunnions (56, 57) by having a cooperative groove on the top and/or bottom inside surfaces of the valve body defining the cavity.

In another embodiment (not shown), the ball member may not contain the upper and/or the lower trunnions (56, 57), whereby the valve can comprise a floating ball valve design. The upper end of the ball member (50) of the floating ball valve design can comprise a flush cavity to accommodate the bottom or the insertable end of the valve stem. In the floating ball valve, the ball member (50) can be held in place by the sealing elements (i.e. the seats) and the stem. Such floating ball valve design is well known in the art. In the floating ball embodiment, the ball member can self-centering and is not prone to problems from tolerance variations as, during operation, the ball member tends to move downstream slightly, compressing and sealing against the seats.

Embodiments usable within the scope of the present disclosure also relate to methods of manufacturing the ball member (50). As described above, one manufacturing technique utilizes a milling machine, or any other similar device, to cut the entire ball member (50) from a single workpiece (not shown), wherein the workpiece is typically a solid piece of material, such as stainless steel, which is machined to form the ball member (50). The workpiece in the described embodiment comprises the same X, Y, and Z axes as the ball member (50).

Figure 7:
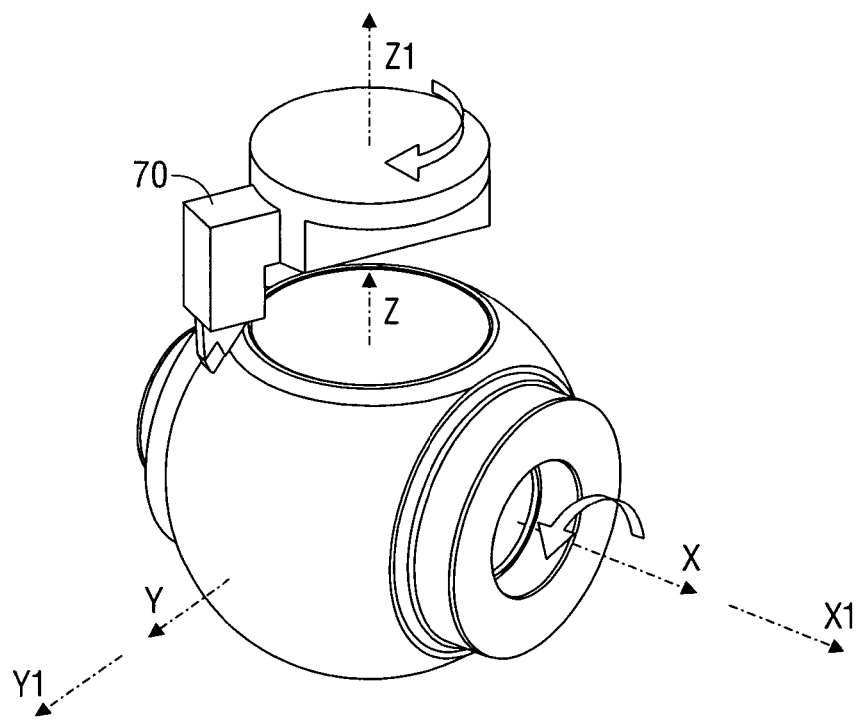
FIG. 7 depicts an isometric view of an embodiment of the device usable within the scope of the present disclosure, which includes a fly cutter and an embodiment of the ball member.

Referring now to FIG. 7, one embodiment of the process of manufacturing the ball member (50) according to the present disclosure is shown. The figure depicts a ball member (50) engaged with a milling machine (not shown) having a fly cutter (70) located above the ball member (50). The figure also designates local coordinates X, Y, and Z, relative to the ball member (50), and universal coordinates, X1, Y1, and Z1, relative to the milling machine and fly cutter (70). The local coordinates are fixed with the ball member (50), wherein the X axis is always aligned with the axis of rotation (X), the Z axis is always aligned with the longitudinal axis (Z), and the Y axis is always located perpendicular to the both the X and Z axes. During the manufacturing process, the local coordinates, X, Y, and Z, change directions with respect to the universal coordinates X1, Y1, and Z1 as the ball member (50) is rotated about the X and X1 axes, which are aligned. The universal coordinates remain static, regardless of the movement of the ball member (50).

One embodiment of the manufacturing process incorporates the use of a milling machine having the capacity to rotate the workpiece about the X1 axis and move the fly-cutter (70) along the Y1 and Z1 axes. A blank workpiece is first engaged with a milling machine, having a spindle and tailstock along the X1 axis, which grip the workpiece on opposite sides, along the X axis of the workpiece.

At the initial stages of the manufacturing process, the local and universal coordinates have the same origin, with X, Y, and Z coordinates being aligned with the X1, Y1, and Z1, coordinates respectively. The initial location of the fly cutter along the local coordinates is (0, 0, Z) and along the universal coordinates is (0, 0, Z1), wherein Z and Z1 values are equal.

The first phase of the milling operations comprise descending the rotating fly cutter (70) towards the origin along the Z and Z1 axis to a value that is equal to the sum of the first radius (61a) and the first offset distance (62a).

The second phase comprises simultaneously: 1) rotating the workpiece, at a constant speed, 180 degrees counter-clockwise, about the X1 axis, 2) further descending the fly cutter towards the origin along the Z1 axis, moving a distance that is equal to the sum of the desired offset distances (62a, 62b), and 3) moving the fly-cutter along the Y1 axis away from the origin for the first 90 degrees of rotation and then towards the origin for the second 90 degrees of rotation, wherein the distance of each motion is equal to the desired first offset distance (62a). The above three steps initiate and terminate at the same time and machine the first spherical segment (51a). At this point, the second spherical segment (51b) can be machined by repeating the first and second phases of the milling operations.

The third phase of the milling operations comprise resetting the rotating fly-cutter (70) above the ball member (50), opposite the starting position of the second phase. As the second phase ends on said opposite side, the fly-cutter can be reset by moving it away from the origin along the Z and Z1 axis to a value that is equal to the sum of the second radius (61b) and the second offset distance (62b).

The fourth phase comprises simultaneously: 1) rotating the workpiece, at a constant speed, 180 degrees counter-clockwise, about the X1 axis, 2) descending the fly cutter towards the origin along the Z1 axis, moving a distance that is equal to the sum of the desired offset distances (62a, 62b), and 3) moving the fly-cutter along the Y1 axis away from the origin for the first 90 degrees of rotation and then towards the origin for the second 90 degrees of rotation, wherein the distance of each motion is equal to the desired second offset distance (62b). The above three steps initiate and terminate at the same time and machine the second spherical segment (51b). Although the method described above discloses rotating the workpiece 180 degrees about the X1 axis, other embodiments of the ball member (50) may require a different method of manufacture, for example, that the workpiece be rotated more or less than 180 degrees, in order to meet the structural requirements of the ball member (50). Similarly, although the method described above discloses moving the fly-cutter along the Y1 axis in specific directions and at specific times during the manufacturing process, in other embodiments of the manufacturing process, the fly-cutter may move along the Y1 axis at different times and different directions, depending on the structural requirements of the ball member (50).

The throughbore (50) can be created by cutting a bore along the Z axis, using any known means, such as a different fly cutter, a drill, or a lathe. The trunnions (56, 57) can also be machined by any known means, such as an appropriately sized fly cutter, a drill, or a lathe. Although described last, the throughbore (50) and the trunnions (56, 57) can be machined either at the beginning or the end of the manufacturing process of the ball member (50).

The ball member (50), as described above, provides operational improvements over valves utilizing typical ball members. FIGS. 1, 2, and 3A depict the aforementioned ball member (50) in its open position, mounted within the housing cavity (24) formed by the valve housing (20) and the bonnet (22), as described above. The ball member (50) is adapted to be rotated through about 90 degrees, whereby in the open position, the throughbore (55) can be aligned with said axial flow channels (21a, 21b), as shown in FIG. 1, and in the closed position, the throughbore can be disposed transverse to the axial flow channels (21a, 21b), to control the flow of fluid through the valve housing (20), as shown in FIG. 3B.

A pair of annular seats (30a, 30b) are supported by housing shoulders (28a, 28b) located about the interior ends of the fluid channels (21a, 21b), wherein the shoulders (28a, 28b) support the seats (30a, 30b) for engagement with the ball member (50). Due to the configuration of the ball member (50), the housing cavity (24), and the seats (30a, 30b), the ball member (50) engages the seats with a variable force, depending on the angular position of the ball member (50) with respect to the seats (30a, 30b). Referring also to FIG. 6B, depicting an embodiment of the ball member (50), as the spherical segments (51a, 51b) of the ball member comprise variable radii (65a, 65b) relative to its axis of rotation (X), the force with which the ball member (50) exerts on the seats (30a, 30b) varies with its angular position. Because the low surface areas (53a, 53b) surrounding the throughbore (55) have shorter radii (65a, 65b), the compressive forces with the seats (30a, 30b) are the smallest in the open valve position. As the radius (65a, 65b) of the ball member (50) increases while moving away from the throughbore (55), the compressive forces between the ball member (50) and the seats (30a, 30b) increase.

Therefore, as the ball member (50) is rotated toward the closed valve position, the high surfaces (52a, 52b) of the ball member (50) contact adjacent surfaces of the seats (30a, 30b) with an increasing force, with maximum seat loading being achieved in the fully closed position of ball member (50). The amount of offset (62a, 62b) that is provided between the high surface areas (52a, 52b) and low surface areas (53a, 53b) to enable this operation is determined experimentally, and to some extent, can be proportional to the size of the valve (10). As the size of the valve (10) increases, the extent to which the seats (30a, 30b) deflect increases, therefore the amount of offset (62a, 62b) between each spherical segment (51a, 51b) and the axis of rotation (X) is also increased.

Although each of the embodiments described above comprises a ball member (50) having offset spherical segments (51a, 51b), the ball member has a symmetrical design, wherein the spherical segments (51a, 51b) are symmetrically positioned about the axis of rotation (X). Furthermore, the ball member (50) is positioned centrally between the two seats (30a, 30b), resulting in a balanced valve design, wherein the ball member (50) seals against both seats (30a, 30b) in the closed valve position. The balanced valve design results in an equal pressure being exerted upon each seat (30a, 30b), giving the ball member (50) additional structural support against excessive internal strains caused by high fluid pressures. Because of the progressively larger diameter, the torque required to rotate the ball member (50) steadily increases, once the ball member comes into contact with the seats (30a, 30b). Since the force of contact is low for most of the valve cycle, increasing significantly as the ball member (50) reaches the closed valve position, a longer seat life is possible, since compressive and frictional forces on the seats (30a, 30b) are reduced as the ball member (50) is rotated to its open valve position.

In the depicted embodiment of the present disclosure shown in FIG. 1, the seats (30a, 30b) and the dimensions of the aforementioned valve elements are so selected that, in the open position of the valve (10), the surfaces of the spherical segments (51a, 51b) contact the seats (30a, 30b) without causing significant flexure of the seats (30a, 30b). This arrangement allows for minimal compression and, therefore, decreases wearing action caused by the ball member (50). Furthermore, because the two offset points (58a, 58b) are located in-line along the longitudinal axis (Z) of the throughbore (55), the low surface areas (53a, 53b), adjacent to the rims (66a, 66b) of the throughbore (55), comprise a symmetrical radius with respect to the axis (Z). This design enables the ball member to make even contact with the entire seat (30a, 30b), resulting in uniform seat loading with the ball member (50).

In the closed valve position, located about 90 degrees from the open valve position, the two offset points (58a, 58b) are located laterally with respect to the seats (30a, 30b), which results in high surface areas (52a, 52b) having a progressively increasing radius (65a, 65b) with respect to the axis of rotation (X). This design can result in an uneven seat (30a, 30b) loading, wherein the portion of the seats located closest to the shoulder (54a, 54b) are compressed more or further than the portion located away from the shoulder (54a, 54b). Non-uniform compression can be compensated by seats (30a, 30b) having adjustable or floating design, such as disclosed above and depicted in FIG. 4 or in U.S. Patent Application Publication No. 2010/0308247A1, which is incorporated herewith in its entirety.

The ball member (50) disclosed herein can also be used with other seats known in the industry, which adjust to a ball member (50) that makes uneven contact with the seats. For example, in another embodiment, the seats can be statically positioned between the housing shoulders (28a, 28b) and the ball member (50), wherein the elastic and other properties of the sealing members allow uneven contact with a ball member (50), while maintaining a leak tight seal. Lastly, as certain embodiments of the ball member (50) comprise small offset distances (62a, 62b) and small shoulder (54a, 54b) heights, almost any commercially available seat will function in conjunction with the ball member (50) of the current disclosure.

While various embodiments usable within the scope of the present disclosure have been described with emphasis, it should be understood that within the scope of the appended claims, the present invention can be practiced other than as specifically described herein.

What is claimed is:

1. A ball member usable in a ball valve, the ball member comprising:
   a first round segment; and
   a second round segment,
   wherein the round segments are offset from one another and integrally joined symmetrically to one another relative to an axis of rotation of the ball member, the ball member having a progressively changing radius with respect to the axis of rotation,
   the ball member having a bore extending therethrough transverse to the axis of rotation, the bore having a longitudinal axis, wherein the ball member further comprises:
      a first shoulder defined by a first surface area located between the first and second round segments, wherein the first round segment extends past the second round segment; and
      a second shoulder defined by a second surface area located between the first and second round segments, wherein the second round segment extends past the first round segment,
   wherein the bore comprises a first opening and a second opening,
   wherein the first shoulder encircles part of the first opening of the bore, and
   wherein the second shoulder encircles part of the second opening of the bore,
   wherein the ball valve is opened and closed to fluid flow by rotating the ball member about the axis of rotation, and
   wherein rotation of the ball member progressively changes force of contact between the ball member and a ball valve seat.

2. The ball member of claim 1, wherein the first and second round segments are offset from one another along the longitudinal axis of the bore.

3. The ball member of claim 1, wherein the first round segment comprises a first center point, wherein the second round segment comprises a second center point, and wherein the first center point and the second center point are positioned along the longitudinal axis of the bore.

4. The ball member of claim 1, further comprising:
a first protruding member extending from the first and the second round segments along the axis of rotation; and
a second protruding member extending from the first and the second round segments along the axis of rotation opposite the first protruding member.

5. The ball member of claim 4, wherein the first protruding member or the second protruding member is integrally formed with the first and the second round segments.

6. The ball member of claim 1, wherein a portion of the first round segment adjacent to a first opening of the bore comprises a symmetrical configuration with respect to the longitudinal axis of the bore, and wherein a portion of the second round segment adjacent to a second opening of the bore comprises a symmetrical configuration with respect to the longitudinal axis of the bore.

7. The ball member of claim 1, wherein the first shoulder encircles approximately half of the first opening of the bore, wherein the second shoulder encircles approximately half of the second opening of the bore.

8. The ball member of claim 1, wherein the ball member further comprises:
a first border located between the first and second round segments; and
a second border located between the first and second round segments opposite the first border,
wherein the first and second borders are located on the surface of the ball member, and
wherein the first and second borders extend around the bore, wherein the first and second borders extend generally perpendicularly with respect to the longitudinal axis of the bore.

9. The ball member of claim 1, wherein the first round segment comprises a first curved surface having a first inwardly curved edge and a first outwardly curved edge, wherein the second round segment comprises a second curved surface having a second inwardly curved edge and a second outwardly curved edge, wherein the first outwardly curved edge coincides with the second inwardly curved edge, wherein the second outwardly curved edge coincides with the first inwardly curved edge.

10. A ball member usable in a ball valve, the ball member comprising:
a first partial sphere having a first surface and a first center of a sphere;
a second partial sphere having a second surface and a second center of a sphere, wherein the first and second partial spheres are integrated with one another forming the ball member having a generally spherical outer shape, and wherein the first center of the sphere and the second center of the sphere are located a distance from one another;
a first shoulder defined by a portion of the first partial sphere extending past the second partial sphere;
a second shoulder defined by a portion of the second partial sphere extending past the first partial sphere, wherein the first shoulder encircles a substantial part of the first end of the bore, and wherein the second shoulder encircles a substantial part of the second end of the bore; and
a bore having a first end, a second end, and a longitudinal axis, wherein the bore extends through the ball member transverse to an axis of rotation of the ball member, wherein the ball valve is opened and closed to fluid flow by rotating the ball member about the axis of rotation.

11. The ball member of claim 10, wherein the first center of the sphere and the second center of the sphere are located at a distance from one another along the longitudinal axis of the bore on either side of the axis of rotation.

12. The ball member of claim 10, wherein a portion of the first surface located adjacent to the first end of the bore comprises a symmetrical configuration with respect to the longitudinal axis of the bore, wherein a portion of the second surface located adjacent to the second end of the bore comprises a symmetrical configuration with respect to the longitudinal axis of the bore.

13. The ball member of claim 10, the ball member further comprising:
the first shoulder defined by an area between the first and second surfaces; and
the second shoulder defined by an area between the first and second surfaces opposite the first shoulder, wherein the first and second shoulders extend around the bore, wherein the first and second shoulders extend generally perpendicularly relative to the longitudinal axis of the bore.

14. The ball member of claim 10, wherein the first surface comprises a first inwardly curving and a first outwardly curving boundary, wherein the second surface comprises a second inwardly curving and a second outwardly curving boundary, wherein the first outwardly curving boundary coincides with the second inwardly curving boundary, wherein the second outwardly curving boundary coincides with the first inwardly curving boundary.

15. The ball member of claim 10, wherein the first shoulder encircles approximately half of the first end of the bore, wherein the second shoulder encircles approximately half of the second end of the bore.

16. The ball member of claim 10, further comprising:
a first trunnion member extending from the ball member along the axis of rotation on the first side of the ball member; or
a second trunnion member extending from the ball member along the axis of rotation on the second side of the ball member; or
a combination thereof.

17. A ball member usable in a ball valve, the ball member comprising:
a body segment having a generally rounded shape and an axis of rotation, wherein the body segment comprises:
a bore having a longitudinal axis, wherein the bore extends through the body segment transverse to the axis of rotation;
a first sloped surface; and
a second sloped surface, wherein the first and second sloped surfaces comprise a progressively changing radius with respect to the axis of rotation;
a first shoulder defined by an area located between the first and second sloped surfaces, wherein the first sloped surface extends past the second sloped surface; and
a second shoulder defined by an area located between the first and second sloped surfaces, wherein the second sloped surface extends past the first sloped surface,
wherein the first and second shoulders are oriented generally parallel relative to each other, and
wherein the ball valve is opened and closed to fluid flow by rotating the body segment about the axis of rotation.

18. The ball member of claim 17, further comprising at least one of:

a first protruding member extending from the body segment along the axis of rotation; and a second protruding member extending from the body segment along the axis of rotation, opposite the first protruding member.

19. The ball member of claim 18, wherein the at least one of the first protruding member and the second protruding member is integrally formed with the body segment.

20. The ball member of claim 17, further comprising:

wherein the bore comprises a first rim and a second rim, wherein the first shoulder encircles part of the first rim of the bore, and wherein the second shoulder encircles part of the second rim of the bore.

21. The ball member of claim 17, further comprising:

the first shoulder located between the first and second sloped surfaces; and the second shoulder located between the first and second sloped surfaces opposite the first shoulder, wherein the first and second shoulders extend around the bore, wherein the first and second shoulders extend generally perpendicular relative to the longitudinal axis of the bore.

22. The ball member of claim 17, further comprising:

the first shoulder located between the first and second sloped surfaces on one side of the ball member; and the second shoulder located between the first and second sloped surfaces on opposite side of the ball member, wherein the bore comprises a first rim and a second rim, wherein the first shoulder extends generally parallel relative to the first rim, and wherein the second shoulder extends generally parallel relative to the second rim.

23. The ball member of claim 17, wherein each of the first and second sloped surfaces comprise inwardly curving and outwardly curving boundaries adjacent to an opening of the bore, wherein a first outwardly curving boundary coincides with a second inwardly curving boundary, wherein a second outwardly curving boundary coincides with a first inwardly curving boundary.

24. The ball member of claim 17, wherein the first shoulder encircles about half of the first rim of the bore, wherein the second shoulder encircles about half of the second rim of the bore.

* * * * *